US008855570B2

(12) United States Patent
Wilhelmsson (10) Patent No.: US 8,855,570 B2
(45) Date of Patent: Oct. 7, 2014

(54) COEXISTENCE OF PLURAL WIRELESS COMMUNICATION TRANSCEIVERS IN CLOSE PROXIMITY

(75) Inventor: Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 462 days.

(21) Appl. No.: 12/629,164

(22) Filed: Dec. 2, 2009

(65) Prior Publication Data

US 2010/0197235 A1 Aug. 5, 2010

Related U.S. Application Data

(60) Provisional application No. 61/150,049, filed on Feb. 5, 2009.

(51) Int. Cl.
| | |
|---|---|
| *H04B 1/00* | (2006.01) |
| *H04W 72/02* | (2009.01) |
| *H04W 16/14* | (2009.01) |
| *H04W 88/06* | (2009.01) |

(52) U.S. Cl.
CPC ............ *H04W 72/02* (2013.01); *H04W 16/14* (2013.01); *H04W 88/06* (2013.01)
USPC ............... 455/63.3; 455/522.1; 455/522.2; 455/448; 455/556.2; 455/509

(58) Field of Classification Search
USPC ........ 455/41.2, 63.1, 63.3, 552.1, 552.2, 448, 455/450, 452.2, 509, 556.2, 574, 63.2, 455/66.1; 370/461, 506, 445, 343
See application file for complete search history.

(56) References Cited

U.S. PATENT DOCUMENTS 6,560,443 B1 * 5/2003 Vaisanen et al. ................. 455/73
6,643,522 B1 * 11/2003 Young ......................... 455/552.1
(Continued)

FOREIGN PATENT DOCUMENTS

| EP | 1463365 A2 | 9/2004 |
| EP | 1 653 672 A1 | 5/2006 |

(Continued)

OTHER PUBLICATIONS

Chiasserini et al. "Coexistence Mechanisms for Interface Mitigation between IEEE 802.11 WLANS and Bluetooth", IEEE INFOCOM 2002, pp. 590-598.

(Continued)

*Primary Examiner* — Temesgh Ghebretinsae
*Assistant Examiner* — M D Talukder
(74) *Attorney, Agent, or Firm* — Leffler Intellectual Property Law, PLLC; Kenneth B. Leffler (57) ABSTRACT

A communication device has a plurality of concurrently operating transceivers, each operating in a respectively different one of a plurality of communication systems, wherein the plurality of concurrently operating transceivers includes a first transceiver and a second transceiver. Operation of the communication device includes the first transceiver ascertaining whether transmissions by the second transceiver are causing interference in a receiver of the first transceiver and if so, performing one or more interference response actions. The one or more interference response actions include ascertaining whether the interference is at an acceptable level and if so then taking no further interference response actions. If the interference is ascertained to be at an unacceptable level, an interference mitigation request is communicated to the second transceiver. The second transceiver can, for example, shift its use of frequencies to a region whereby the first transceiver's band select filter can sufficiently attenuate the second transceiver's signal.

7 Claims, 6 Drawing Sheets

(56) References Cited

U.S. PATENT DOCUMENTS

| | | | |
|---|---|---|---|
| 7,269,389 B2* | 9/2007 | Petrus et al. | 455/69 |
| 7,406,296 B2* | 7/2008 | Haartsen | 455/41.2 |
| 7,634,231 B2* | 12/2009 | Hundal | 455/63.1 |
| 7,856,047 B2* | 12/2010 | Wang et al. | 375/132 |
| 7,873,385 B2* | 1/2011 | Boireau et al. | 455/553.1 |
| 8,023,898 B2* | 9/2011 | Abedi | 455/63.1 |
| 8,086,239 B2* | 12/2011 | Elmaleh | 455/446 |
| 8,526,388 B1* | 9/2013 | Kaukovuori et al. | 370/329 |
| 8,565,681 B2* | 10/2013 | Kim et al. | 455/63.1 |
| 2005/0124333 A1* | 6/2005 | Van Den Bogaert et al. | 455/420 |
| 2005/0191964 A1* | 9/2005 | Hundal | 455/63.1 |
| 2005/0276241 A1 | 12/2005 | Kamerman et al. | |
| 2006/0094364 A1* | 5/2006 | Hirota et al. | 455/66.1 |
| 2006/0171445 A1* | 8/2006 | Batra et al. | 375/130 |
| 2006/0292986 A1* | 12/2006 | Bitran et al. | 455/41.2 |
| 2007/0165754 A1* | 7/2007 | Kiukkonen et al. | 375/346 |
| 2007/0183338 A1 | 8/2007 | Singh et al. | |
| 2007/0217455 A1* | 9/2007 | Haeusler | 370/913 |
| 2007/0224936 A1 | 9/2007 | Desai | |
| 2007/0238483 A1* | 10/2007 | Boireau et al. | 455/553.1 |
| 2007/0254596 A1* | 11/2007 | Corson et al. | 455/68 |
| 2008/0045152 A1* | 2/2008 | Boes | 455/63.1 |
| 2008/0297415 A1* | 12/2008 | Berens et al. | 342/372 |
| 2009/0116437 A1* | 5/2009 | Alexandre et al. | 370/329 |
| 2009/0176454 A1* | 7/2009 | Chen et al. | 455/63.1 |
| 2010/0120362 A1* | 5/2010 | Walley et al. | 455/41.2 |
| 2010/0197235 A1* | 8/2010 | Wilhelmsson | 455/63.3 |
| 2010/0227570 A1* | 9/2010 | Hendin | 455/78 |
| 2011/0149920 A1* | 6/2011 | Liu et al. | 370/336 |

FOREIGN PATENT DOCUMENTS

| | | |
|---|---|---|
| EP | 1 838 040 A2 | 9/2007 |
| JP | 2003234745 C1 | 8/2003 |
| JP | 2006025083 A | 1/2006 |
| JP | 2006129247 A | 5/2006 |
| JP | 2008236407 A | 10/2008 |
| JP | 2008244987 A | 10/2008 |
| WO | 01/89102 A1 | 11/2001 |
| WO | 2007/096683 A1 | 8/2007 |

OTHER PUBLICATIONS

PCT International Search Report, dated May 4, 2010, in connection with International Application No. PCT/EP2010/051191.
PCT Written Opinion, dated May 4, 2010, in connection with International Application No. PCT/EP2010/051191.
International Preliminary Report on Patentability, completed Jul. 22, 2011, in connection with International Application No. PCT/EP2010/051191.
Japanese Office Action, mailed Jan. 20, 2014, in connection with counterpart Japanese Patent Application No. 2011-548659, all pages.
Translation of Japanese Office Action, mailed Jan. 20, 2014, in connection with counterpart Japanese Patent Application No. 2011-548659, all pages.

* cited by examiner

COEXISTENCE OF PLURAL WIRELESS COMMUNICATION TRANSCEIVERS IN CLOSE PROXIMITY

CROSS REFERENCE TO RELATED APPLICATIONS

This application claims the benefit of U.S. Provisional Application No. 61/150,049, filed Feb. 5, 2009, which is hereby incorporated herein by reference in its entirety.

BACKGROUND

The present invention relates to wireless telecommunication systems, and more particularly to methods and apparatuses that enable multiple radio systems to operate in the same or close radio spectra and/or located geographically near to each other.

When a few decades ago, spectrum regulations were changed to allow commercial radio applications in unlicensed bands, interest was marginal. But this interest has changed radically in the last few years. After the worldwide success of mobile telephony in licensed bands, capacity limitations and huge license fees have spurred the interest of radio applications in the unlicensed band. In the past few years, communications systems such as those operating in accordance with the Wireless Local Area Network (WLAN) IEEE 802.11 standards and the Bluetooth® standards have been increasingly deployed in the 2.4 GHz band. Moreover, new communications systems are being worked on, such as the Wireless Personal Area Network (WPAN) activity under IEEE 802.15.

Radio spectrum, even unlicensed, is limited. Despite this, ubiquitous communications using several different standards is foreseen in the near future. Coexistence is not trivial as different standards follow different protocols. Moreover, regulations, initially intended to provide fair sharing, are constantly changing to allow for higher data rates, yet moving away from robustness requirements. The use of an unlicensed band poses the challenge of coexistence. In the design phase of a new communication system that has to operate in the unlicensed band, the developer has to design units that will be expected to share the band with:

Incumbent non-communications: Power unintentionally radiated by equipment, for example microwave ovens, will be a source of disturbance.

Incumbent communications: Intended radiation by other communication systems like for example WLAN, Bluetooth®, or Radio Frequency-Identification (RF-ID) will also be experienced as disturbance when no coordination is applied.

Future systems: Systems that do not exist yet but which will be built in the future can cause severe disturbances. The only known factors are the restrictions imposed upon these systems by the regulations. However, as discussed before, regulations are changing over time, making predictions rather unreliable.

Coexistence can be handled in a number of different ways, as will now be discussed.

Interference mitigation by applying direct-sequence spreading or forward-error-correction coding can be useful, but is usually insufficient due to the near-far problem. That is, in ad-hoc scenarios in particular, a jamming transmitter can come very close to a receiver. The power levels received can thus be sufficiently strong to bring the front-end of the receiver into saturation, which causes clipping. As a result of the clipping (which imposes non-linear effects) the effective gain decreases (desensitization) and intermodulation products arise.

Avoidance is another method of mitigating interference. Avoidance in time can be applied by listening-before-talk or Carrier Sense Multiple Access/Collision Avoidance (CSMA/CA) as applied in IEEE 802.11 and other standards. However, this renders suboptimal solutions because the collision measurements render absolute power levels whereas the Packet Error Rate (PER) depends on the Carrier-to-Interference (C/I) ratio.

Avoidance in frequency is provided by frequency agile techniques such as Dynamic Frequency Selection (DFS). In this method, the system measures where in the frequency band other transmitters are active, and subsequently avoids these frequency segments. This is fine when potential jammers broadcast their presence continuously, for example on a control channel. However, measuring on bursty data channels results in unreliable measurements. Hopping provides better mitigation methods based on frequency avoidance. Because of the large isolation between the intended signal and the jammer when the hopper and jammer do not coincide, rather good robustness can be obtained. However, frequency hopping only works when the jammers are narrowband; likewise, time hopping only works when jammers have a low duty cycle. Incumbent systems in the unlicensed bands usually are bandwidth restricted but are rarely duty cycle restricted, posing a problem for time hopping systems like Ultra-Wideband (UWB) Impulse Radio.

Arranging for the different systems to use different frequencies is another coexistence technique. However, when the different transceivers are located in the very same device or are otherwise very close to one another, practical problems relating to filtering out strong interference result in the use of different frequency bands being insufficient to avoid interference between the different systems unless those different frequency bands are sufficiently separated from one another.

More particularly, when the different systems are sufficiently separated in frequency, coexistence is typically ensured by means of filtering. In this way the systems can be treated independent of one another, as if the other systems were not at all present. In such cases, the performance of each system will be unaffected of operation of the other systems. The cost associated with this approach is the possibility of very hard requirements on the necessary filters. In addition, a filter also causes attenuation loss of the desired signal, known as the insertion loss. This results in degraded sensitivity for systems that employ such hard filtering.

When the different systems operate very close to one another in frequency, filtering is generally not a feasible solution, due to the very hard requirement on the attenuation required to ensure that the victim system will not be severely degraded.

Thus, often the only feasible way of coexistence is the use of time division, in which the systems are coordinated in time so that no two systems are active at the same time. One issue related to coexistence by means of time division is that some kind of collaboration between the systems usually is needed. For instance, if it is known by one system that another system is receiving, the former might delay its transmission not to interfere with the latter. Alternatively, the latter system might choose not to use the information received in case it knows the former is transmitting, and instead rely on that the information can be obtained anyway through powerful coding and time interleaving or possibly by retransmission mechanisms.

Coordination between the systems is, for example, the typical approach used when Bluetooth® and WLAN technology are co-located in the same device. A method known as Packet Traffic Arbitration (PTA) is used, and this results in one of the two standards being given priority over the other one. Priorities are typically based on the type of service that is being carried by the respective systems. For example, if one of the systems is carrying delay sensitive data (e.g., voice or streaming video) and the other is carrying data that is not delay sensitive (e.g., file download), higher priority is typically given to the delay sensitive service.

A problem with using coexistence solutions based on time division is that the systems that are given low priority might not work well. For instance, it might not be possible to guarantee the desired Quality of Service (QoS) of one system if there is another active system having a higher priority. Consider the situation in which the higher priority system has a lot of data to transmit: this can seriously hamper the performance of the lower priority system. Suppose two or more systems have relatively stringent delay constraints, with one of the systems having a higher priority than the others. Automatically favoring the higher priority system under these circumstances can result in the lower priority systems failing to work properly. This can happen, for example, as a result of the lower priority systems having excessively long delays between communication of traffic which results in lost connections due to timeouts. If the systems are used for relaying information, things might not work at all because the relaying function only works if all involved systems work properly.

Another problem with coexistence solutions based on time division is the poor utilization of the available spectrum. If only one system is used at a time, parts of the spectrum will always be unused for data transmission, and effectively used only as a guard band.

Today, the Industrial, Scientific and Medical (ISM) band at 2.4-2.485 GHz is used both by Bluetooth® technology and by WLAN. Both of these incompatible technologies can be found in mobile phones, and the percentage of phones that will have both Bluetooth® and WLAN technology built into them will increase in the future. The bands used for the cellular standards, like the Global System for Mobile Communication (GSM) and Wideband Code Division Multiple Access (WCDMA) are today located several hundred MHz away from the ISM band, and ensuring co-existence between for instance Bluetooth® technology and the cellular standards has been easily achieved by means of filtering. However, with the introduction of technology built in accordance with the Worldwide Interoperability for Microwave Access (WiMAX) standard, which might be used in the 2.3-2.4 GHz band, filtering might not be sufficient to ensure co-existence. Also, with the International Mobile Telecommunications-2000 (IMT-2000) extension band located at 2.5-2.69 GHz, filtering alone might not suffice to ensure coexistence with standards using the 2.4 GHz ISM band. IMT-2000 technology (e.g., TD-SCDMA and E-UTRA TDD) will also use the 2.3-2.4 GHz band, which in 3GPP terminology is referred to as Band 40.

As these various communication devices become smaller, the number of transceivers in different devices like mobile phones, personal digital assistants (PDAs), laptop computers, and the like is increasing. This means that co-existence between different systems is an issue that can be expected to become even more pronounced in the future.

Therefore, it is desirable to have methods and apparatuses that enable various radio communication systems to coexist with one another in an efficient way.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for operating a communication device. The communication device has a plurality of concurrently operating transceivers, each operating in a respectively different one of a plurality of communication systems, wherein the plurality of concurrently operating transceivers includes a first transceiver and a second transceiver. Operation includes the first transceiver ascertaining whether transmissions by the second transceiver are causing interference in a receiver of the first transceiver and if so, performing one or more interference response actions. The one or more interference response actions include ascertaining whether the interference is at an acceptable level and if so then taking no further interference response actions. However, if the interference is ascertained to be at an unacceptable level, then the first transceiver communicates an interference mitigation request to the second transceiver.

In an aspect of such embodiments, the second transceiver is operating on a first frequency in a first frequency band, wherein the first frequency band at least partially overlaps with a passband and/or a transition band of a band select filter of the first transceiver's receiver.

In an aspect of some embodiments consistent with the invention, the interference mitigation request can include a request for the second transceiver to cease operating on the first frequency in the first frequency band and instead to operate on a second frequency in the first frequency band that is more attenuated by the band select filter of the first transceiver's receiver than the first frequency band is.

In some embodiments, operating in a region of higher attenuation by the band select filter of the first transceiver's receiver means that the second frequency band is in a stop band of the first transceiver's receiver's band selective filter.

In some other embodiments, the first transceiver ascertains an amount by which the second frequency band can be permitted to lie outside a stop band of the first transceiver's receiver's band select filter while maintaining a level of receiver performance above a predetermined threshold. It will be observed that "lying outside a stop band" of a band select filter means lying within one or both of the band select filter's passband region or its transition band.

In yet another aspect, operation of the communication device includes the first transceiver receiving information about a power level used by the second transceiver's transmissions. The first transceiver utilizes the information about the power level used by the second transceiver's transmissions in a process of ascertaining the amount by which the second frequency can be permitted to lie outside a stop band of the first transceiver's receiver's band select filter while maintaining a level of receiver performance above a predetermined threshold.

In still other embodiments, the interference mitigation request includes a request for the second transceiver to cease operation on the first frequency in the first frequency band and instead to operate on a frequency in a second frequency band. In such embodiments, the second frequency band lies completely within a stop band of a band select filter of the first transceiver's receiver.

In yet other embodiments, the interference mitigation request includes a request for the second transceiver to reduce a second transceiver transmission power level.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

To more easily appreciate various aspects of the invention and understand its merits, the description involves several specific known communication standards. However, it should be understood that this is not intended to limit the scope of the invention in any way. To the contrary, the described techniques can equally well be used in connection with other communication standards. Moreover, generalization to more than the illustrated number of standards is also possible.

To further facilitate an understanding of various inventive aspects, the description is made for the case in which only two transceivers (each operating within a different communication system) are co-located within the same device and potentially interfere with one another. Techniques for applying the various inventive aspects to more than two transceivers will be readily apparent to those of ordinary skill in the art after reading this disclosure.

Figure 1:
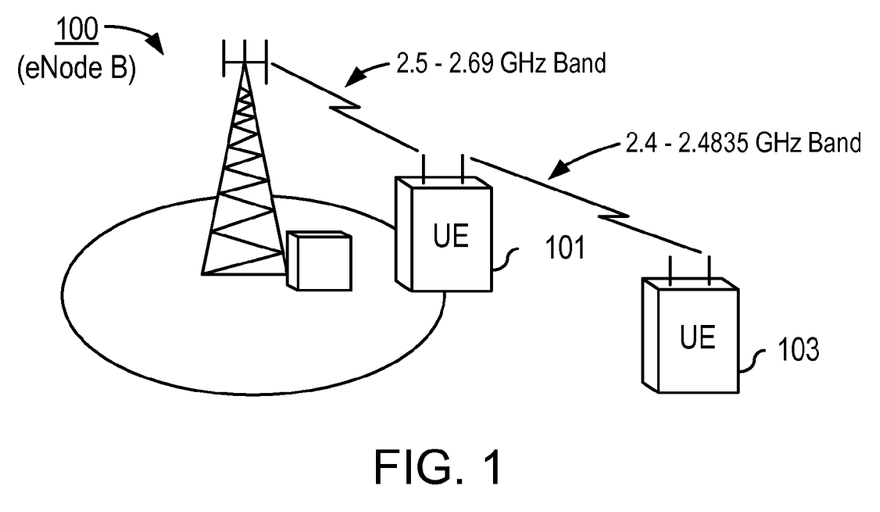
FIG. 1 is a block diagram illustrating coexistence problems that arise when a user equipment communicates with an eNode B of a cellular telecommunications system using one frequency band, and also communicates with a second user equipment using a second frequency band.

FIG. 1 is a block diagram of an eNode B (base station) 100 of a cellular telecommunications system. In this example, the air interface of the cellular communications system operates in accordance with the Third Generation Partnership Project's (3GPP's) Long Term Evolution (LTE) standards, and communications take place in the 2.5-2.69 GHz band. To illustrate coexistence situations, a first user equipment (UE) 101 is depicted that has first transceiver circuitry designed to operate in accordance with Bluetooth® standards, and these communications take place in the 2.4-2.4835 GHz ISM band. As is well-known, Bluetooth® technology utilizes adaptive frequency hopping spread spectrum techniques, which avoid using crowded frequencies in the hopping sequence, thereby improving resistance to radio frequency interference. In the illustrated example, the first user equipment 101 is engaged in Bluetooth®-compatible communications with a second user equipment 103.

The first user equipment 101 also communicates with the eNode B 100. To enable these communications, the first user equipment 101 includes second transceiver circuitry designed to operate in accordance with any version/release of the LTE standard.

In the example illustrated in FIG. 1, the first transceiver's communications in the 2.4-2.4835 GHz band are subject to interference from the second transceiver's operation in the 2.5-2.69 GHz band, and (at least in some operating modes) vice versa. The co-location of the first and second transceivers within the same device (e.g., the first user equipment 101) makes this especially problematic.

As explained in the Background section, interference avoidance and/or mitigation by means of frequency division (filtering) is a preferred means for achieving coexistence because time division (scheduling) can substantially reduce the level of performance of one of the involved systems. However, when systems are operating so close in frequency that filtering is not an option, the existing means of ensuring coexistence is to resort to time division duplex operation.

Figure 2:
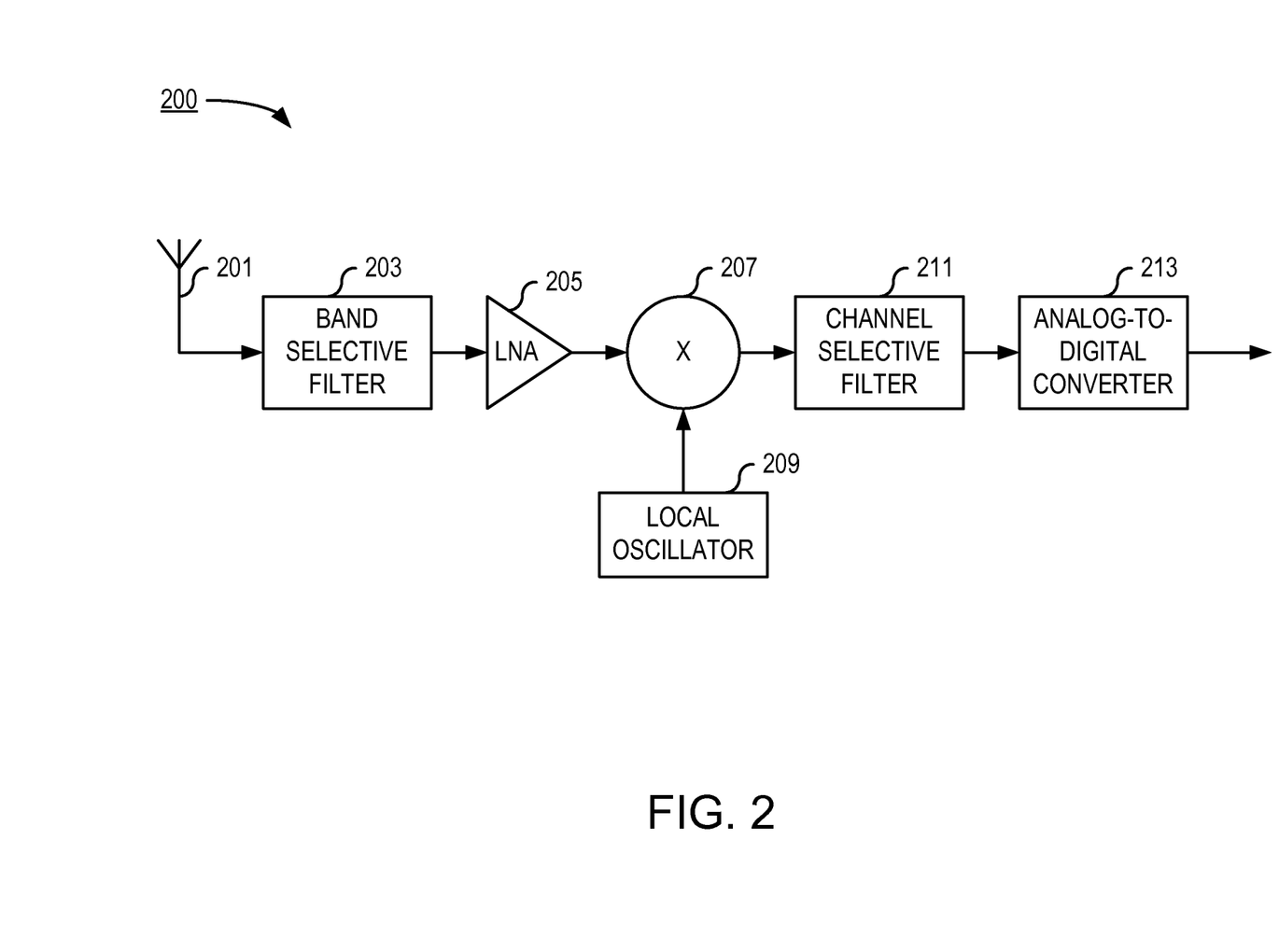
FIG. 2 is a block diagram of exemplary receiver circuitry that utilizes filtering to mitigate the effects of interference.

A receiver in a wireless communication system constitutes a number of different blocks, as illustrated in FIG. 2. In particular, FIG. 2 is a block diagram of exemplary receiver circuitry 200 that utilizes filtering to mitigate the effects of interference. The received signal is first passed from an antenna 201 through a band selective filter (BSF) 203. The band selective filter 203 is a bandpass filter with a passband corresponding to the range in which the received signal can be located. Typically, this filter is used to filter out interference from other systems. Interfering signals from the same system will not be attenuated. For example, the band selective filter 203 of a Bluetooth® receiver, which operates in the ISM band, will remove interference that is outside of the ISM band, like cellular systems operating at for instance 1800 MHz. However, interference from, for instance, other Bluetooth® units or from WLAN units that are operating in the ISM band will not be suppressed. The bandwidth of the band selective filter 203 is typically on the order of 100 MHz. That is, the passband is on the order of 100 MHz. The bandwidth of the transition band might vary depending on what is needed. However, there is a limitation regarding how narrow the transition band can be made, and representative figures for what can be achieved are on the order of 20-40 MHz.

The filtered signal supplied at the output of the band selective filter 203 is typically amplified by a low noise amplifier (LNA) 205 and then down-converted from radio frequency (RF) into a baseband signal by a mixer 207 that receives, at one input, the RF signal from the low noise amplifier 205 and at another input, a matching RF signal supplied by a local oscillator 209. The baseband signal supplied at an output of the mixer 207 is passed through a channel selective filter (CSF) 211 having a bandwidth that corresponds to the bandwidth of the signal. So, in the Bluetooth® technology example in which the signal bandwidth is about 1 MHz, the channel selective filter 211 would also have a bandwidth of about 1 MHz. The signal supplied at the output of the channel selective filter 211 is then converted into a series of digital samples by an analog-to-digital converter 213, so that further processing can be performed in the digital domain.

Whereas the channel selective filter 211 is the key component when it comes to suppressing interference that has been transmitted in the same band, it is the band selective filter 203 that determines how well interference from systems in adjacent bands can be handled.

In case of strong interference from other systems, a major potential source of performance degradation is compression of the low noise amplifier 205 and the mixer 207. This is particularly a problem when the frequency of the interference is so close to the frequency of the desired signal that the band selective filter 203 only attenuates the interfering signal by a small amount.

As explained above in the Background section, there are two fundamentally different approaches for dealing with interference, namely, time division (scheduling) and frequency division (filtering). The problem with the former is that it reduces the available transmission time for at least one of the involved systems. The problem with the latter is that it might not at all be feasible, and even if it is feasible it will typically introduce an insertion loss so that the performance of the system employing it is degraded even in the absence of interference.

To address these problems, various embodiments consistent with the invention make a frequency division (filtering) solution feasible by trying to allocate the interfering system's operation to a carrier frequency that makes filtering easier for the interfered-with receiver. In some embodiments, this can mean re-allocating the interfering system's operating spectrum to a completely different frequency band. Alternatively, it can involve just shifting the carrier frequency of the interfering system a little within the same frequency band.

Still another aspect of some embodiments consistent with the invention is the introduction of a coordination function, so that the different users in a system that can experience interference from one or more other systems are allocated carrier frequencies in accordance with their needs for interference suppression from other systems operating in adjacent frequency bands.

Figure 3:
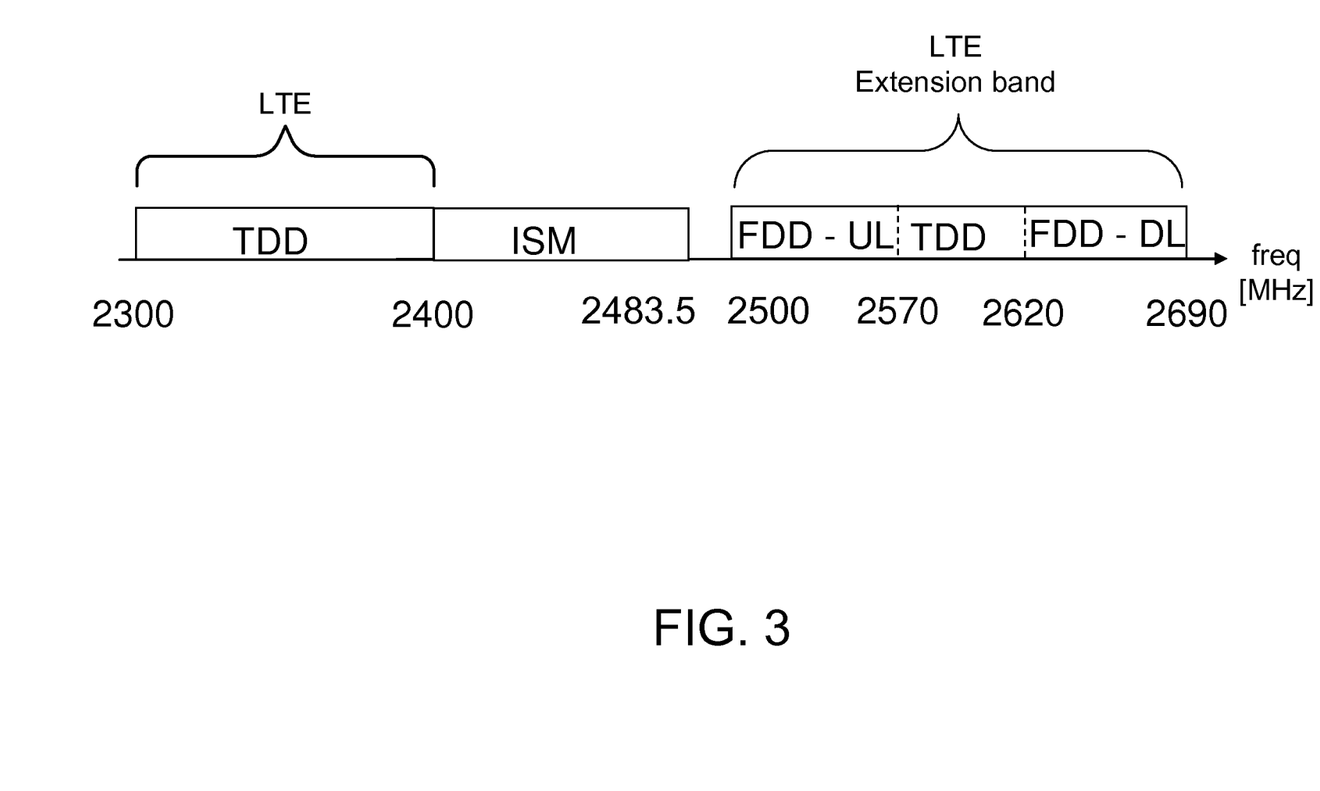
FIG. 3 is a graph showing frequency allocations of ISM-compatible equipment and of LTE-compatible equipment.

These and other aspects will now be described in further detail. To facilitate the use of specific examples, FIG. 3 is a graph showing frequency allocations of ISM-compatible equipment and of LTE-compatible equipment. As can be seen in the figure, LTE TDD mode of operation is allocated to 2300-2400 MHz. The ISM band is allocated to 2400-2483.5 MHz. An LTE extension band then occupies 2500-2690 MHz, which is partitioned as follows: 2500-2570 MHz is used as uplink frequencies in LTE FDD mode; 2570-2620 MHz is used for LTE TDD mode; and 2620-2690 MHz is used as downlink frequencies in LTE FDD mode.

Suppose that a first transceiver operates in accordance with Bluetooth® standards in the 2.4-2.4835 GHz ISM band, and that a second transceiver is simultaneously operating in accordance with LTE standards in the 2.5-2.69 GHz band. Specifically, suppose that the Frequency Division Duplex (FDD) mode of LTE is used, in which the uplink (UL) transmissions are allocated to 2500-2570 MHz and in which downlink (DL) transmissions are allocated to 2620-2690 MHz.

Moreover, suppose that the maximum output power from LTE is +23 dBm and that the minimum output power is −10 dBm. Furthermore, suppose that the Bluetooth® transmitter has a 1 dB compression point (CP) at −26 dBm, typically corresponding to an input referred third order intercept point (IIP3) at about −16 dBm. In addition, suppose that the antenna coupling between the LTE transceiver and the Bluetooth® transceiver is −15 dB (i.e., the power of the LTE signal is attenuated by 15 dB in the transfer from the LTE (transmit) antenna to the Bluetooth® receiver antenna).

When a signal that is too strong enters the front-end of a receiver, a reasonable assumption is that the sensitivity of the receiver is degraded by the same amount that the received signal power exceeds the 1 dB compression point. This implies that if the LTE transmitter is transmitting at 23 dBm, so that the received interference power for the Bluetooth® transceiver will be 23−15=8 dBm, the sensitivity is degraded by 34 dB.

Figure 4:
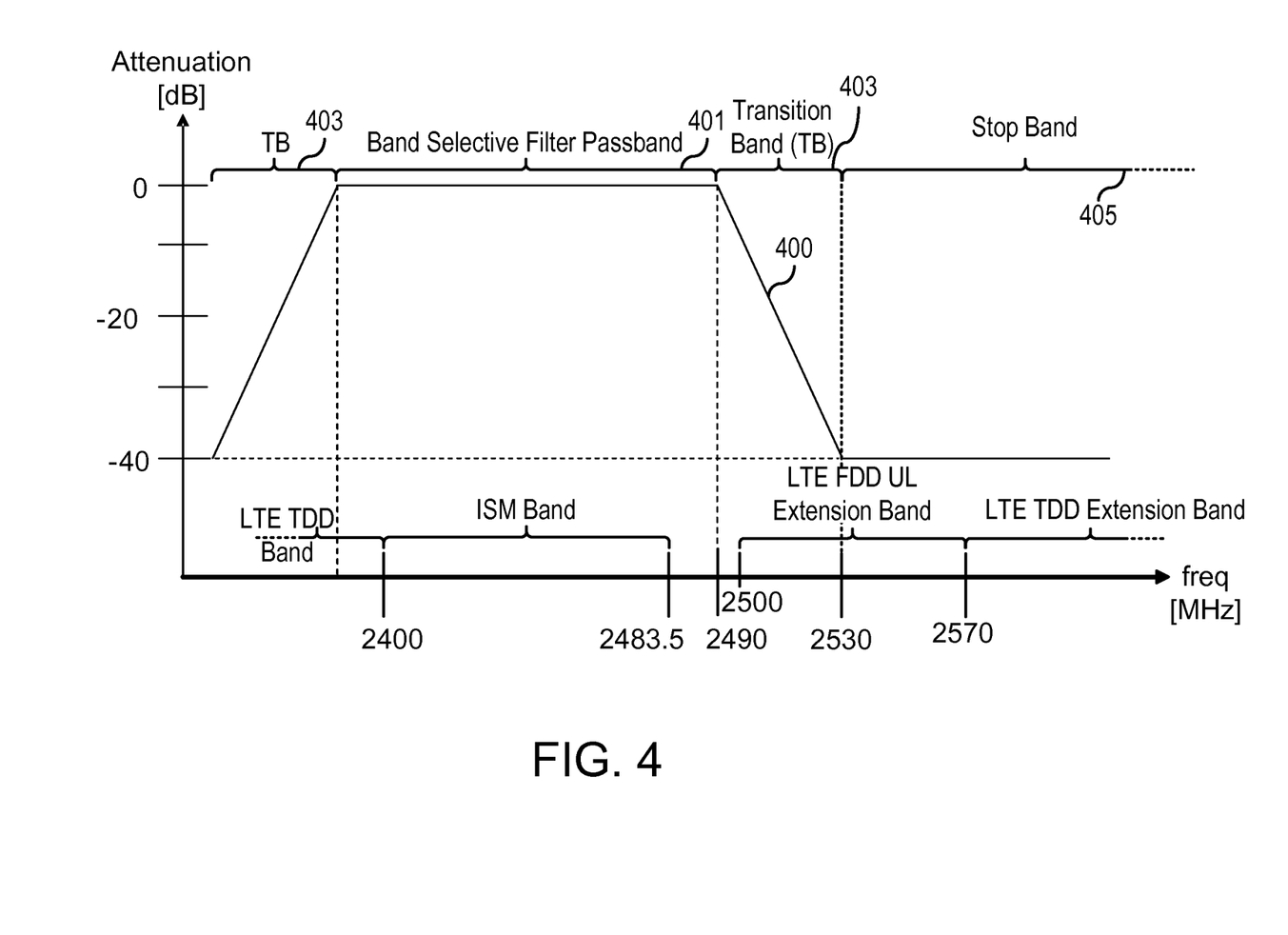
FIG. 4 is a graph showing a simple model for an amplitude function of a band selective filter in a receiver.

In practice, the band selective filter 203 might help to some extent since it will attenuate the interfering signal, especially if the interfering LTE signal is not transmitted at the very lowest frequency of the available spectrum (i.e., the low end of the 2500-2570 MHz spectrum). A graph 400 showing a simple model for the amplitude function of the band selective filter 203 is shown in FIG. 4. The band selective filter 203 is characterized by a passband region 401 that is at least coincident with the receiver's band of operation and in practice can be wider than the band of operation. Signals falling within the passband region 401 are only marginally attenuated—an interfering signal would have its full effect here.

Adjacent to and on each side of the passband region 401 is what is herein referred to as a "transition band (TB)" 403. The transition band 403 is characterized by increasing attenuation the more distanced a received signal is from a reference point within the passband 401. Interfering signals lying within a transition band 403 are attenuated but, depending on their power levels and distance from the passband 401, may or may not be sufficiently attenuated to noticeably degrade receiver performance.

Adjacent to and on a side of each transition band 403 farthest from the passband 401 is what is herein referred to as a stop band 405 of the band selective filter 203. The stop band for a filter can in a practical implementation be assumed to achieve an attenuation on the order of, for example, 40-60 dB. Often, such high attenuation is sufficient to ensure that interference from other systems does not cause any compression in the front-end of the receiver.

It can seen from the graph 400 that an LTE signal transmitted at 2500 MHz will only be marginally attenuated because it coincides with part of the Bluetooth® receiver's transition band 403 at a location close to (e.g., in this example only 10 MHz away from) the Bluetooth® receiver's passband region 401, whereas an LTE signal transmitted at 2570 MHz, well into the Bluetooth® receiver's band select filter's stop band 405, will be attenuated by as much as 40 dB.

It can be noted that whereas the frequency used by an LTE transmitter in this example will have a significant impact on how severely the Bluetooth® receiver will be degraded, the frequency used by the Bluetooth® receiver will be of virtually no importance; that is, it does not improve matters to have the Bluetooth® communications take place by means of a frequency at the lower end of the ISM band so that the frequency distance to the LTE signal is large, nor is it worse if the Bluetooth® communications are by means of a frequency at the upper end of the ISM band so that the frequency distance to the LTE interference is small.

For the case in which the LTE transmitter is transmitting at a 23 dBm output power, it can be seen that if this takes place above 2530 MHz, so that the attenuation is on the order of 40 dB (since the LTE signal has a certain bandwidth, the entire signal will not be uniformly attenuated by 40 dB, but on average somewhat less), the signal power at the low noise amplifier input will be on the order of 23−15−40 dBm=−32 dBm; that is, below the 1 dB compression point.

Figure 5:
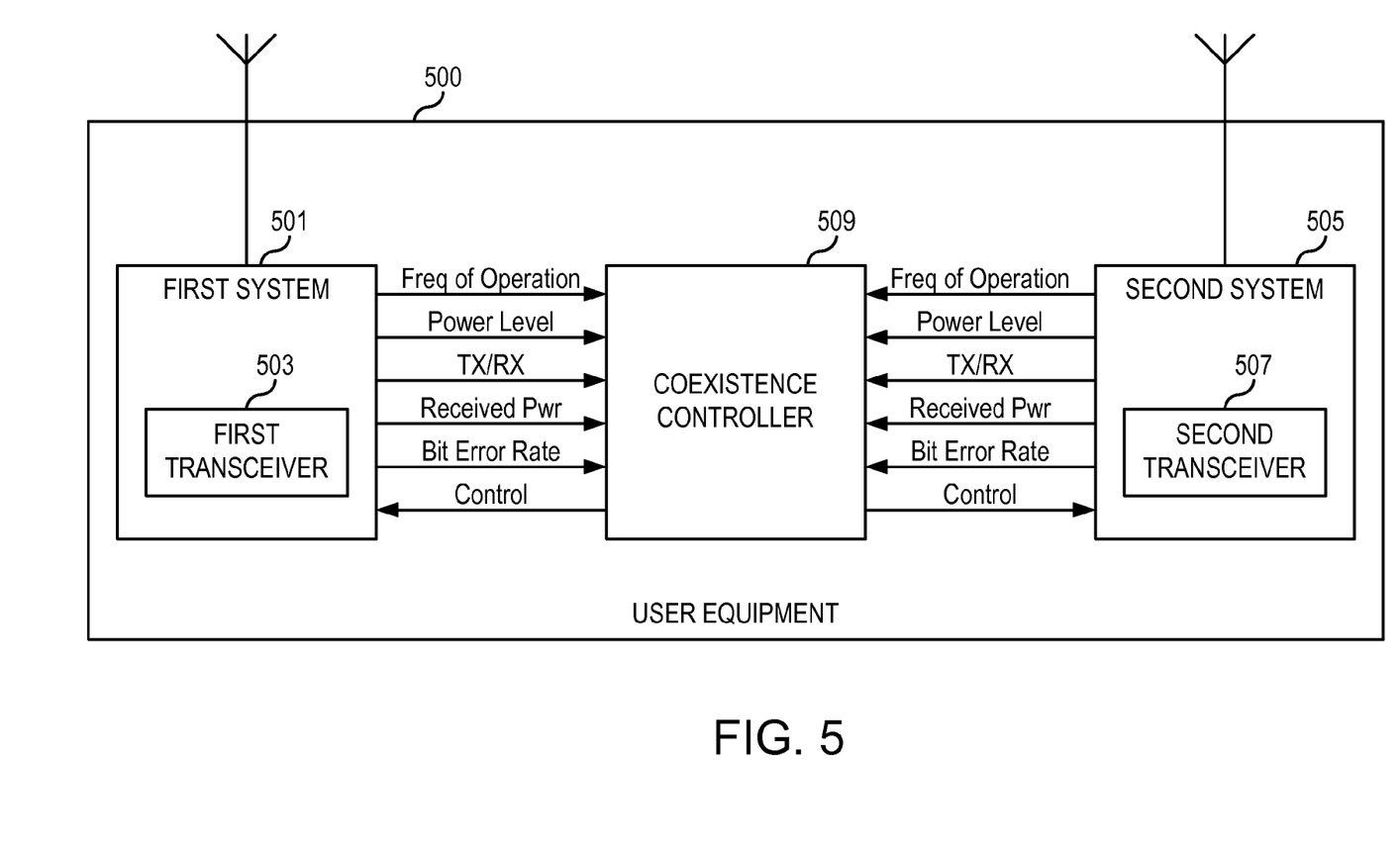
FIG. 5 is a block diagram of an exemplary UE 500 adapted with circuitry to enable operation with any of a number of embodiments consistent with the invention.

FIG. 5 is a block diagram of an exemplary UE 500 adapted with circuitry to enable operation with any of a number of embodiments consistent with the invention. The UE 500 includes a first system 501 comprising a first transceiver 503. Co-located with the first system 501 in the UE 500 is a second system 505 comprising a second transceiver 507. The first and second systems 501, 505 operate in accordance with different air interface standards relative to one another, and each can be any one of a number of different types of technologies as discussed earlier. It is assumed that, at least under some circumstances, the first system 501 operates on a first frequency and the second system 505 operates on a second frequency, wherein the second frequency is within a passband range or a transition band of a band select filter of the first system's receiver. It is this encroaching of the second system's signal into a region of less than maximum attenuation of the first system's receiver's band selective filter that results in the band selective filter's inability to completely isolate its receiver from the other system's transmissions.

The UE 500 further includes a coexistence controller 509, which is circuitry configured to control both the first and second systems 501, 505 so as to enable their simultaneous operation as much as possible (i.e., it is desired to rely on filtering rather than scheduling as much as possible to enable coexistence without detrimentally affecting the throughput of either system). To enable the coexistence controller 509 to perform its functions, it exchanges various information and control signals with each of the first and second systems 501, 505. The identity and purpose of these various signals are discussed further below.

Figure 6:
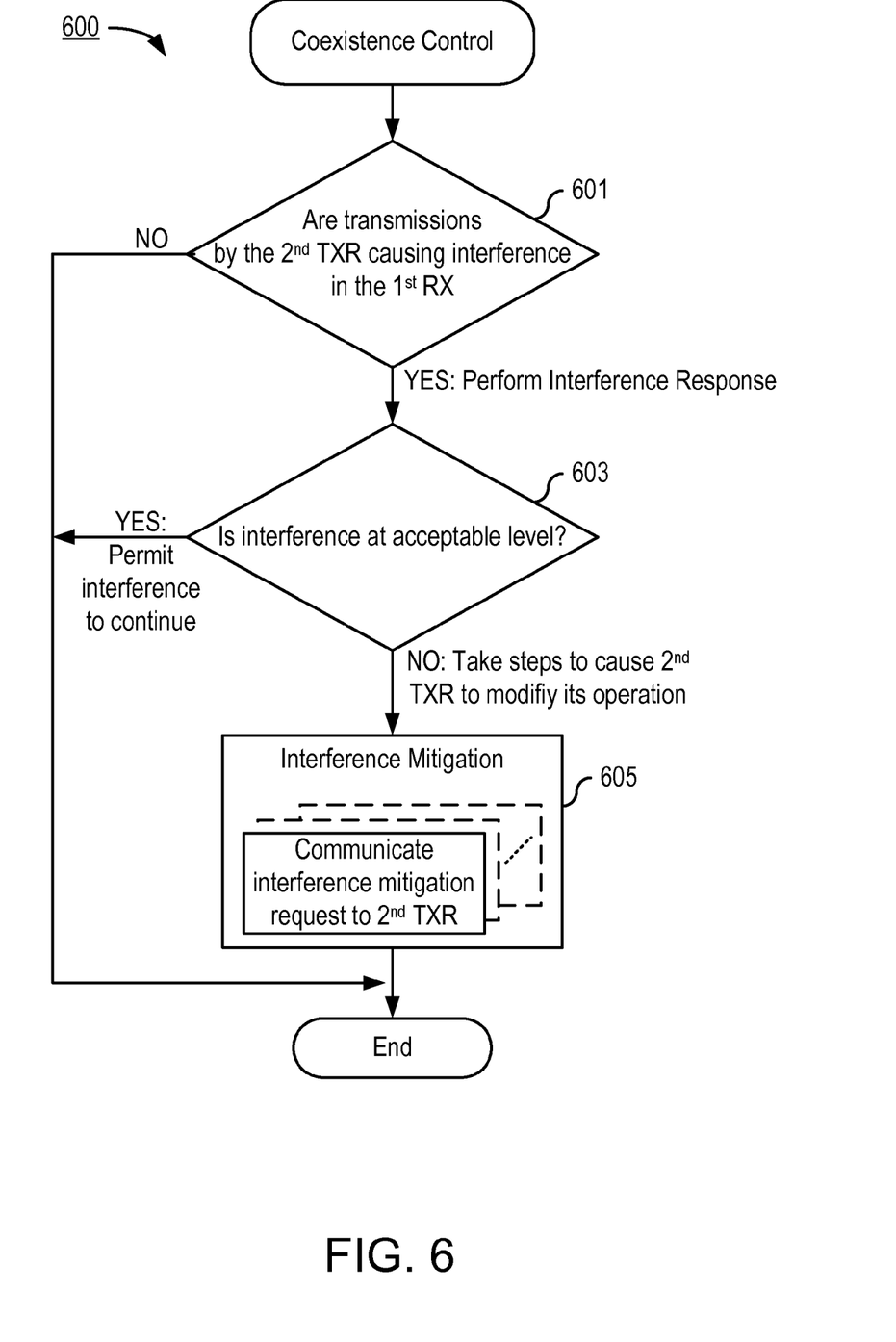
FIG. 6 is, in one respect, a flow diagram of exemplary steps/processes carried out by a user equipment or components thereof in accordance with aspects of the invention in an exemplary embodiment.

FIG. 6 is, in one respect, a flow diagram of exemplary steps/processes carried out by a user equipment or components thereof (e.g., by the coexistence controller 509 of the user equipment 500) in accordance with aspects of the invention in an exemplary embodiment. FIG. 6 can also be considered to depict an exemplary apparatus 600 comprising various circuitry configured to carry out the functions described herein.

The aspects depicted in FIG. 6 effect operation of a communication device having a plurality of concurrently operating transceivers, each operating in a respectively different one of a plurality of communication systems, wherein the plurality of concurrently operating transceivers includes a first transceiver and a second transceiver. The first and second transceivers can be co-located within a single device, such as within a UE.

In one aspect, it is ascertained whether transmissions by the second transceiver are causing interference in a receiver of the first transceiver (decision block 601). If not ("NO" path out of decision block 601), no further steps need to be taken. Ascertaining whether transmissions by the second transceiver are causing interference in a receiver of the first transceiver can be accomplished in any of a number of ways. For example, the interfering system can signal the fact that it is transmitting and on what frequencies and at what power levels. This information can be sufficient for the affected system to know when interference exists.

However, in alternative embodiments, interference-related parameters are not expressly signaled, but are instead inferred by the affected system. For example, the first transceiver can measure received power as well as the bit error rate associated with a received signal. If the received power is high but the bit error rate is also high, then this can be taken as an indicator of problematic (i.e., unacceptable) interference.

Conversely, the second system might signal the fact that it is creating interference, and yet the first system might nonetheless ascertain that the measured bit error rate is at an acceptable level. Under such circumstances, no action is required and the interfering system can continue to transmit at the original frequency. This is another example of a characteristic of embodiments consistent with the invention: interference mitigation actions are taken only when actually necessary, not merely because interference is nominally present.

If transmissions by the second transceiver are causing interference in the first transceiver's receiver ("YES" path out of decision block 601), then one or more interference response actions are taken. These include ascertaining whether the interference is at an acceptable level (decision block 603) and if so ("YES" path out of decision block 603) then taking no further interference response actions. This relates to the fact that the interference may not actually constitute a problem for the first transceiver. For example, it might be the case that the interference is a problem whenever the second transceiver is transmitting at an output power exceeding, say, 10 dBm, but not otherwise. For this reason, it is useful in some embodiments for the second system to inform not only about when a transmission is taking place and on which frequency/ies, but also at what power level. In this way, the system experiencing the interference (in this example, the first transceiver) can decide whether to switch to another frequency, or possibly whether to request that the interfering system move to another frequency.

However, if the interference is ascertained to be at an unacceptable level ("NO" path out of decision block 603), then one or more interference mitigation steps are taken (step 605), including communicating an interference mitigation request to the second transceiver system. The interference mitigation request can be different in different embodiments.

In one embodiment the interference mitigation steps include identifying how much the second transceiver's signal needs to be reduced in order not to have any significant impact on the first receiver's performance. Taking the example in which the first transceiver is Bluetooth® communication equipment and the second transceiver is mobile communication equipment operating in accordance with LTE standards, identifying by how much the second transceiver's signal should be reduced can mean that the LTE signal power that reaches the Bluetooth® receiver's low noise amplifier should not exceed the 1 dB CP, but other criteria are also possible. The first (e.g., Bluetooth®) transceiver then communicates an interference mitigation request to the second (e.g., LTE) transceiver, requesting that the second transceiver either use less output power or use a frequency that is farther away from the first transceiver's receiver's band selective filter's passband region so that the band selective filter of the first transceiver's receiver will attenuate the signal to a larger extent.

Another way of considering this aspect is that the affected system ascertains what the maximum output power for the interfering system is in order for simultaneous transmission to work properly. This ascertained level is communicated to the interfering system, which can then make use of this knowledge. Without such knowledge, the interfering system might respond to a degraded communication link by increasing its output power level. However, with the knowledge, the interfering system can instead respond to a degraded communication link by using more robust modulation and coding.

In view of the above, the discussion will now consider a few examples. First, suppose that an LTE transceiver's output power is 23 dBm at 2500 MHz, and that this is disturbing a first (Bluetooth®) transceiver's reception. The LTE transceiver can be requested to use only frequencies that are above, say 2530 MHz. If the output power is lower, a larger range of frequencies can be allowed to be used by LTE (e.g., frequencies above 2515 MHz).

In another embodiment, the interfering system ("second transceiver" in the context of this description, although of course it is arbitrary which transceiver is considered a "first" transceiver and which is considered a "second" transceiver) is requested to use a completely different frequency band. For instance, instead of operating in the 2.5-2.69 GHz band, it might be requested that the LTE transceiver operate at 700 MHz or some other frequency band that is available.

Another example in which interference is a potential problem is when WLAN equipment performance is interfered by LTE equipment. The embodiment described above is applicable here as well. In another embodiment of the invention, which is feasible for WLAN equipment, the interfered system is moved to another frequency band. For example, if the IEEE 802.11g-compatible equipment, which operates in the ISM band, experiences severe interference from LTE equipment, it might be found advantageous to instead use 802.11a, which is similar to 802.11g, but with the important difference being that it operates above 5 GHz. In this embodiment, the (potential) victim system decides what frequency band to use depending on actually experienced interference from LTE. Since the propagation conditions are better at 2.4 GHz, this frequency band is used in the absence of interference or in case the interference level is sufficiently low. Otherwise, the 5 GHz band is used.

In a refinement of the above embodiments, the requirements of the Bluetooth®/WLAN link are taken into account. For instance, for the first embodiment in which Bluetooth® equipment was the victim, it is determined how much loss in sensitivity would be acceptable. In case the Bluetooth®-compatible link would have a margin of, for example, 20 dB due to the distance between the communicating Bluetooth® devices being small, the LTE transceiver operation would not have to be moved all the way up to 2530 MHz, but could for example be requested to use frequencies above 2515 MHz. The exact value can be simply calculated by the amplitude function of the band selective filter of the Bluetooth® receiver.

To recapitulate some of the aspects described above, an interference mitigation request (communicated to the second (interfering) system in step 605) can include a request for the second transceiver to cease operating on its present frequency and instead to operate on a different frequency (in either the same or a different frequency band) that is in a region of higher attenuation by the band select filter of the first transceiver's receiver than the present frequency of operation is.

The new frequency of operation for the second (interfering) system can, for example, be in a stop band of the first transceiver's receiver's band selective filter.

Alternatively, the circuitry can ascertain an amount by which the new frequency of operation can be permitted to lie outside a stop band of the first transceiver's receiver's band select filter while maintaining a level of receiver performance above a predetermined threshold. To facilitate this determination, the first transceiver (i.e., the affected receiver) can receive information about a power level used by the second transceiver's transmissions. The first transceiver then utilizes the information about the power level used by the second transceiver's transmissions in a process of ascertaining the amount by which the second (interfering) transceiver's new frequency of operation can be permitted to lie outside a stop band of the first transceiver's receiver's band select filter while maintaining a level of receiver performance above a predetermined threshold.

The invention has been described with reference to particular embodiments. However, it will be readily apparent to those skilled in the art that it is possible to embody the invention in specific forms other than those of the embodiment described above.

For example, in the description as well as in the claims, it may be stated that "the first transceiver" performs a particular action, or that the "second transceiver" performs a particular action. However, it will be appreciated by those of ordinary skill in the art that this can equivalently be accomplished by means of shared circuitry acting on behalf of one transceiver or another. For example, the illustrated coexistence controller 509 can be considered to be part of the first transceiver 503 when it is taking actions on behalf of the first transceiver 503, and can alternatively be considered to be part of the second transceiver 507 when taking actions on behalf of the second transceiver 507.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a communication device having a plurality of concurrently operating transceivers, each operating in a respectively different one of a plurality of communication systems, wherein the plurality of concurrently operating transceivers includes a first transceiver and a second transceiver, the method comprising:

the first transceiver ascertaining whether transmissions by the second transceiver are causing interference in a receiver of the first transceiver and if so, performing one or more interference response actions, wherein the one or more interference response actions include:

ascertaining whether the interference is at an acceptable level and if so then taking no further interference response actions; and if the interference is ascertained to be at an unacceptable level, then communicating an interference mitigation request to the second transceiver, wherein:

the second transceiver is operating on a first frequency in a first frequency band;

the first transceiver is operating in a second frequency band that is different from the first frequency band;

the first frequency band partially overlaps with at least one of a passband and a transition band of a band select filter of the first transceiver's receiver;

the interference mitigation request includes a request for the second transceiver to cease operating on the first frequency in the first frequency band and instead to operate on a second frequency;

the request for the second transceiver to cease operating on the first frequency in the first frequency band and instead to operate on the second frequency is a request for the second transceiver to cease operating on the first frequency in the first frequency band and instead to operate on a second frequency in the first frequency band that is more attenuated by the band select filter of the first transceiver's receiver than the first frequency is; and the method further comprises ascertaining an amount by which the second frequency can be permitted to lie outside a stop band of the first transceiver's receiver's band select filter while maintaining a level of receiver performance above a predetermined threshold, wherein the second frequency lies no farther outside the stop band of the first transceiver's receiver's band select filter than the ascertained amount.

2. The method of claim 1, comprising:

the first transceiver receiving information about a power level used by the second transceiver's transmissions; and the first transceiver utilizing the information about the power level used by the second transceiver's transmissions in a process of ascertaining the amount by which the second frequency can be permitted to lie outside the stop band of the first transceiver's receiver's band select filter while maintaining a level of receiver performance above a predetermined threshold.

3. The method of claim 1, wherein the interference mitigation request includes a request for the second transceiver to reduce a second transceiver transmission power level.

4. An apparatus for operating a communication device having a plurality of concurrently operating transceivers, each operating in a respectively different one of a plurality of communication systems, wherein the plurality of concurrently operating transceivers includes a first transceiver and a second transceiver, the apparatus comprising:

circuitry associated with the first transceiver and configured to ascertain whether transmissions by the second transceiver are causing interference in a receiver of the first transceiver and if so, to perform one or more interference response actions, wherein the one or more interference response actions include:

ascertaining whether the interference is at an acceptable level and if so then taking no further interference response actions; and if the interference is ascertained to be at an unacceptable level, then communicating an interference mitigation request to the second transceiver, wherein:

the second transceiver is configured to operate on any of a plurality of frequencies including a first frequency in a first frequency band;

the first transceiver is operating in a second frequency band that is different from the first frequency band;

the first frequency band partially overlaps with at least one of a passband and a transition band of a band select filter of the first transceiver's receiver;

the interference mitigation request includes a request for the second transceiver to cease operating on the first frequency in the first frequency band and instead to operate on a second frequency;

the request for the second transceiver to cease operating on the first frequency in the first frequency band and instead to operate on the second frequency is a request for the second transceiver to cease operating on the first frequency in the first frequency band and instead to operate on a second frequency in the first frequency band that is more attenuated by the band select filter of the first transceiver's receiver than the first frequency is; and the apparatus further comprises circuitry associated with the first transceiver and configured to ascertain an amount by which the second frequency can be permitted to lie outside a stop band of the first transceiver's receiver's band select filter while maintaining a level of receiver performance above a predetermined threshold, wherein the second frequency lies no farther outside the stop band of the first transceiver's receiver's band select filter than the ascertained amount.

5. The apparatus of claim 4, comprising:

circuitry associated with the first transceiver and configured to receive information about a power level used by the second transceiver's transmissions; and circuitry associated with the first transceiver and configured to utilize the information about the power level used by the second transceiver's transmissions in a process of ascertaining the amount by which the second frequency can be permitted to lie outside the stop band of the first transceiver's receiver's band select filter while maintaining a level of receiver performance above a predetermined threshold.

6. The apparatus of claim 4, wherein the interference mitigation request includes a request for the second transceiver to reduce a second transceiver transmission power level.

7. The apparatus of claim 4, comprising the second transceiver;

circuitry associated with the second transceiver and configured to receive the interference mitigation request and in response thereto, to perform one or more interference mitigation actions.

* * * * *